United States Patent [19]

Colburn et al.

[11] 4,129,714
[45] Dec. 12, 1978

[54] ETHYLENE COPOLYMERS AND TERPOLYMERS CONTAINING VINYL ESTERS OF TERTIARY ACIDS

[75] Inventors: Samuel E. Colburn, Atwood; Duane K. Bryant, Charleston, both of Ill.; Gerald M. Platz, West Chester, Ohio; Clarence J. Vetter, Jr., Atwood, Ill.

[73] Assignee: National Distillers and Chemical Corporation, New York, N.Y.

[21] Appl. No.: 705,509

[22] Filed: Jul. 15, 1976

Related U.S. Application Data

[63] Continuation of Ser. No. 350,255, Apr. 11, 1973, abandoned, which is a continuation of Ser. No. 123,003, Mar. 10, 1971, abandoned, which is a continuation-in-part of Ser. No. 861,165, Sep. 25, 1969, abandoned.

[51] Int. Cl.² .................... C08F 210/02; C08F 218/10
[52] U.S. Cl. ................................ 526/331; 260/28.5 A
[58] Field of Search ......................................... 526/331

[56] References Cited

U.S. PATENT DOCUMENTS

| | | | |
|---|---|---|---|
| 2,310,780 | 2/1943 | Hanford et al. | 260/87.3 |
| 2,473,996 | 6/1949 | Hanford et al. | 260/87.3 |
| 3,373,148 | 3/1968 | Macotie et al. | 260/87.3 |
| 3,394,114 | 7/1968 | Anderson | 260/87.3 |
| 3,455,887 | 7/1969 | Levine | 260/80.81 |
| 3,506,630 | 4/1970 | Beier et al. | 260/80.81 |
| 3,562,229 | 2/1971 | Bauer et al. | 260/80.81 |

*Primary Examiner*—Stanford M. Levin
*Attorney, Agent, or Firm*—Kenneth D. Tremain

[57] ABSTRACT

Copolymers of ethylene with one or more vinyl esters of tertiary carboxylic acids having the formula:

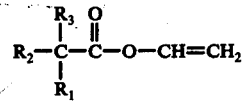

wherein each of $R_1$, $R_2$ and $R_3$ is an alkyl group, the total number of carbon atoms in $R_1$, $R_2$ and $R_3$ being from 6 to 20, and an additional unsaturated monomer.

8 Claims, No Drawings

ETHYLENE COPOLYMERS AND TERPOLYMERS CONTAINING VINYL ESTERS OF TERTIARY ACIDS

CROSS REFERENCE TO RELATED APPLICATION

This is a continuation of Ser. No. 350,255, filed Apr. 11, 1973, now abandoned, which is a continuation of Ser. No. 123,003 filed Mar. 10, 1971 (now abandoned) which in turn is a continuation-in-part of Ser. No. 861,165, filed Sept. 25, 1969 (now abandoned).

BACKGROUND OF THE INVENTION

1. Field of the Invention

The present invention relates to novel copolymers prepared from vinyl esters of carboxylic acids capable of polymerizing with ethylene and a third monomer, using a high pressure, free radical process. In particular, the present invention is directed toward polymerizing ethylene and vinyl esters having the formula $C_{12}H_{22}O_2$ or $C_{11}H_{20}O_2$ in the presence of a third comonomer.

2. Description of the Prior Art

Homopolymers of ethylene and copolymers containing ethylene are known in the art of producing high molecular weight polymers by high pressure, free radical polymerization. In general, as compared to the homopolymers, the copolymers are more flexible, less resistant to elevated temperatures, less solvent resistant, have greater elongation, better resistance to low temperature embrittlement, greater film impact strength, improved tear resistance when formed into films, and more resistant to agents which cause ethylene homopolymers to crack under prolonged stress. In addition, the copolymers are often higher in density than the ethylene homopolymers.

These properties are determined by standard physical property tests. Exemplary tests are torsional stiffness (ASTM D 1043-61T); vicat softening point (ASTM D 1525-58T); extractable content in boiling n-hexane (Food and Drug Administration 21 CFR 121.2501); elongation (ASTM D 638 with Die C of D 412-62T for specimen); low temperature brittleness (ASTM D 746-64T); dart drop strength (ASTM D 1709-62T); Elmendorf tear strength (ASTM D 1922-61T); stress crack (ASTM D 1642); and density (ASTM D 1505).

One of the most important ethylene copolymers presently marketed contains vinyl acetate. While ethylene/vinyl acetate copolymers may have desirable properties, for certain applications requiring flexible "rubbery" materials, they are deficient in heat and solvent resistance. It has now been discovered that the flexibility of ethylene/vinyl acetate copolymers can be retained while improving the heat and solvent resistance by replacing part of the vinyl acetate in the copolymer with a vinyl ester of a tertiary carboxylic acid. Further, the vinyl esters utilized in the present invention result in a product of lower density. This is of particular importance since it allows the plastics processor to produce more units of a given size per pound of copolymers utilized.

SUMMARY OF THE INVENTION

The present invention is directed to the preparation of copolymers of ethylene with one or more vinyl esters of tertiary carboxylic acids having the general formula:

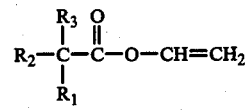

wherein each of $R_1$, $R_2$ and $R_3$ is an alkyl radical and the total number of carbon atoms in $R_1$, $R_2$ and $R_3$ is from 6 to 20 and another vinyl monomer. The incorporation of these ester compounds into copolymers of ethylene with another monomer, preferably a vinyl monomer, and especially vinyl acetate, yields copolymers of superior physical characteristics. In particular, the polymers of this invention have similar melt indices and densities, as compared with ethylene homopolymers, but exhibit improved tensile and elongation strengths and lower yield strengths, as well as other characteristics such as superior low temperature brittleness properties. Also, the polymers of the present invention overcome the difficulties noted above with regard to ethylene/vinyl acetate copolymers. Copolymers of this invention have the same applications in general as do comparable ethylene homopolymers. They are particularly useful in the production of items made by injection molding or blow molding techniques. Further, excellent carpet coating resins can be produced by mixing the instant polymers with wax and polyethylene.

The improvement of such physical characteristics is the basic object of the present invention.

A further object is to produce polymers having lower density than previous polymers.

DETAILED DESCRIPTION OF THE INVENTION

The polymers of the present invention contain from 30% to 98%, preferably 45 to 98 weight percent of ethylene, and from 0.1 to 70, preferably from 1 to 55 weight percent of a vinyl ester of a tertiary carboxylic acid. The vinyl esters utilized in the present invention have the following general formula:

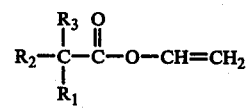

wherein each of $R_1$, $R_2$ and $R_3$ is alkyl, preferably lower alkyl, and the total number of carbon atoms in $R_1$, $R_2$ and $R_3$ is from 6 to 20, preferably 7 to 10. Exemplary compounds are the following: vinyl 1,1-dimethylheptanoate; vinyl 1-methyl-1-propylpentanoate; vinyl 1-methyl-1-ethylhexanoate; vinyl 1,1-diethylhexanoate; vinyl 1,1-dimethyloctanoate; vinyl 1-methyl-1-propylhexanoate; vinyl 1-methyl-1-ethyl-heptanoate; vinyl 1-methyl-1-butylpentanoate and vinyl 1-iso-propyl-1-methylhexanoate.

In addition, from 1 to 50 weight percent, and preferably from 1-40 weight percent of an additional monomer is incorporated in the polymers. Such third monomers include propylene, isobutylene, acrylonitrile, and vinyl acetate, and in general, any monomers which are generally recognized as copolymerizable with ethylene. Preferred third monomers are alpha-olefins and vinyl esters of 2 to 6 carbon atom aliphatic carboxylic acids. Vinyl acetate is particularly preferred.

Additionally, the polymers may contain up to 5% of telogens, modifiers or chain transfer agents. Such additional components act, for example, to regulate molecular weight and crystallinity of the polymer. Exemplary of such added components are hydrogen and saturated hydrocarbons, such as propane, butane, and cyclohexanone.

The tertiary carboxylic acids utilized herein may, for example, be produced by the reaction between an olefin or a mixture of olefins of a suitable number of carbon atoms with carbon monoxide. The reaction may be carried out in an aqueous medium in the presence of an acid catalyst.

The vinyl esters of the above tertiary carboxylic acids are produced, for example, by the reaction of an acid produced by the above process with ethylene at about 0° to 150° C. and a pressure of about 1 to 100 atmospheres. The reaction is carried out in the presence of a precious metal salt as a catalyst. Exemplary processes are disclosed in British Pat. Nos. 969,017 and 969,018, herein incorporated by reference.

The polymerization reaction, whereby the polymers of the present invention are obtained, is usually a high pressure free-radical polymerization process. For example, the polymerization may be effected at above 10,000 psi and at a temperature of above 250° F. Although wider ranges are operable, the pressure usually varies from about 10,000 to 45,000 psi, and the temperature from 250° to 500° F. The catalyst used is a free radical initiator, and can be a peroxy compound or an azo compound. The reaction is conducted under solvent-free conditions except for the possible inclusion of minute amounts of catalyst carrier solvent which may be utilized.

The following examples are included as illustrative of the present invention, however, they are not to be considered as limiting, but solely as illustrating the preferred embodiments of the polymers of the present invention.

Ethylene was copolymerized with vinyl acetate and a mixture of several different vinyl esters. The vinyl ester mixture used, Shell Chemical Company's VV 9 (Registered Trademark), was a mixture of vinyl esters of tertiary carboxylic acids, which esters had the formula $C_{11}H_{20}O_2$. The composition by weight of the mixture was as follows:

| | |
|---|---|
| vinyl 1,1-dimethylheptanoate | 36% |
| vinyl 1-methyl-1-propylpentanoate | 27% |
| vinyl 1-methyl-1-ethylhexanoate | 32% |
| not identified | 5% |

The synthesis conditions and product properties of the ethylene/vinyl t-carboxylate/vinyl acetate copolymers, and an ethylene/vinyl acetate copolymer were as follows:

| | VV9/Vinyl Acetate Copolymer | Copolymer |
|---|---|---|
| Monomer(s) | VV 9 | Vinyl Acetate |
| Monomer Rate, pph | 5.43 | 10.6 |
| Monomer #2 | Vinyl Acetate | — |
| Monomer #2 Rate, pph | 5.08 | — |
| Ethylene Rate, pph | 120 | 110 |
| Polymer Make Rate, pph | 6.5 | 7.9 |
| Reaction Pressure psi | 20,000 | 20,000 |
| Avg. Reaction Temp. °F | 426 | 420 |
| Melt Index | 9.31 | 7.92 |
| Density | 0.9240 | 0.9330 |
| Tensile Strength psi | 1510 | 1460 |
| Yield Strength psi | 760 | no point |
| Elongation, % | 740 | 740 |
| Modulus, psi | 6,800 | 6,600 |

-continued

| | VV9/Vinyl Acetate Copolymer | Copolymer |
|---|---|---|
| Torsional Stiffness psi | 7,200 | 5,800 |
| Low Temp. Brittleness F/50, °C. | 3/10 at-76 | 0/10 at-76 |
| Stress Crack, F/50, hr. | 0/10 at 48 | 0/10 at 48 |
| Vicat Softening Point, °C. | 66.5 | 62.0 |
| Monomer Incorporation, % | 5 | 15.62 |
| Extractibles, % | 2.05 | 49.71 |

Typical physical properties of the mixture of tertiary carboxylic acid ester monomers utilized are:

| | |
|---|---|
| General Appearance | Colorless, mobile liquid of pleasant odor |
| Molecular Formula | $C_{11}H_{20}O_2$ |
| Molecular Weight | 184.3 |
| Hydroquinone Inhibitor | 5 ppm |
| Boiling Point | 60° C. at approx. 2mm |
| Flash Point, Tag Open Cup | 152° V. |
| Color, Hazen | 5 |
| Density | 0.885 gram/ml at 25° C. |
| Refractive Index, $n_D$ | 1.4370 |
| Acidity | 1 mg KOH/gram |
| Bromine Number | 86 grams Br/100 grams |
| Water Content | 0.68% w |
| Solubility in Water | 0.05% w |
| Solubility of Water in Ester | 0.06% w |

Similar results are obtained when the vinyl ester mixture used in the preparation of the copolymer is Shell Chemical Company's VV 10 (Registered Trademark), which contained the following vinyl esters (formula $C_{12}H_{22}O_2$) in the following proportions by weight:

| | |
|---|---|
| vinyl 1,1-dimethyloctanoate | 50% |
| vinyl 1-methyl-1-ethylheptanoate | 35% |
| vinyl 1-methyl-1-propylhexanoate and vinyl 1-isopropyl-1-methylhexanoate | 15% |

In comparing the copolymers containing the vinyl esters of the tertiary carboxylic acids of the present invention with those containing ethylene and vinyl acetate, it should be noted that certain desirable properties of the ethylene/vinyl acetate copolymers are retained, while deficiencies can be alleviated by replacing part of the vinyl acetate with the vinyl esters of the present invention. In particular, the melt index and torsional stiffness of the different polymers remain approximately the same, while the softening temperature is increased and extractibles are decreased.

We claim:

1. A normally solid interpolymer consisting essentially of from 30 to 98 weight percent of ethylene, from 0.1 to 70 weight percent of a tertiary carboxylic acid vinyl ester monomer mixture having the formula

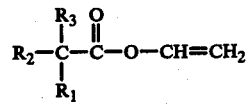

wherein $R_1$, $R_2$ and $R_3$ are alkyl groups, and the total number of carbon atoms in said $R_1$, $R_2$ and $R_3$ is from 6 to 20, and from 1 to 50 weight percent of vinyl acetate.

2. The interpolymer of claim 1 wherein the amount of said vinyl acetate is from 1 to 40 weight percent.

3. The interpolymer of claim 2 wherein the amount of said ethylene is 45 to 98 weight percent, and the amount of said tertiary carboxylic acid vinyl ester monomer mixture is 1 to 55 weight percent.

4. The interpolymer of claim 1 wherein the total number of carbon atoms in said $R_1$, $R_2$ and $R_3$ is 7 to 10.

5. The interpolymer of claim 1 wherein the tertiary carboxylic acid vinyl ester monomer mixture comprises vinyl esters selected from the group consisting of vinyl 1,1-dimethyheptanoate, vinyl 1-methyl-1-propylpentanoate, vinyl 1-methyl-1-ethyl-hexanoate, vinyl 1,1-diethylhexanoate, vinyl 1,1-dimethyl-octanoate, vinyl 1-methyl-1-propylhexanoate, vinyl 1-methyl-1-ethyl-heptanoate, vinyl 1-methyl-1-butylpentanoate and vinyl 1-isopropyl-1-methylhexanoate.

6. The interpolymer of claim 5 wherein the amount of said ethylene is 45 to 98 weight percent, the amount of said tertiary carboxylic acid vinyl ester monomer mixture is 1 to 55 weight percent and wherein the amount of said vinyl acetate is from 1 to 40 weight percent.

7. The interpolymer of claim 6, wherein said monomer mixture comprises vinyl 1,1-dimethylheptanoate, vinyl 1-methyl-1-propylpentanoate, and vinyl 1-methyl-1-ethyl hexanoate.

8. The interpolymer of claim 7, being the product of the reaction under solvent free conditions and in the presence of a free-radical catalyst at a temperature above 250° F. and at a pressure above 10,000 psi of ethylene, vinyl acetate and monomer, said monomer comprising vinyl 1,1-dimethyl heptanoate, vinyl 1-methyl-1-propylpentanoate, and vinyl 1-methyl-1-ethyl-hexanoate in a weight ration of 36:27:32, said ethylene, vinyl acetate and monomer being supplied at a weight charge rate ratio of 120:5.08:5.43.

* * * * *